United States Patent [19]

Roueche

[11] 4,334,932
[45] Jun. 15, 1982

[54] PIGMENT FORMULATIONS, PROCESSES FOR THEIR PREPARATION AND THEIR USE FOR PIGMENTING AQUEOUS, ALCOHOLIC OR AQUEOUS-ALCOHOLIC PRINTING INK SYSTEMS AND COLORED LACQUER SYSTEMS

[75] Inventor: Armand Roueche, Bottmingen, Switzerland

[73] Assignee: Ciba-Geigy Corporation, Ardsley, N.Y.

[21] Appl. No.: 251,423

[22] Filed: Apr. 6, 1981

[30] Foreign Application Priority Data

Apr. 23, 1980 [CH] Switzerland .......................... 3129/80

[51] Int. Cl.³ .............................................. C09D 17/00
[52] U.S. Cl. ............................... 524/191; 106/308 M; 106/288 Q; 524/194; 524/556; 524/522; 524/503
[58] Field of Search ..................... 166/288 Q, 308 M; 262/42.21

[56] References Cited

U.S. PATENT DOCUMENTS 3,725,101 4/1973 Kühne et al. .................. 106/288 Q
3,759,731 9/1973 Kühne et al. .................. 106/288 Q

FOREIGN PATENT DOCUMENTS 45-11026 4/1970 Japan .............................. 106/288 Q

*Primary Examiner*—James Poer
*Attorney, Agent, or Firm*—Luther A. R. Hall

[57] ABSTRACT

Pigment formulations which contain
(1) 10–90% by weight, based on the whole formulation, of a pigment mixture of
(a) 99.5–90 mol %, based on the pigment mixture, of at least one monoazo pigment of the general formula

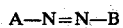

and (b) 0.5–10 mol %, based on the pigment mixture, of at least one monoazo pigment of the formula

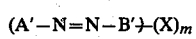

characterized by the presence of at least one —COOH, —SO$_3$H, metal carboxylate or metal sulfonate group per pigment molecule, and
(2) 90–10% by weight, based on the whole preparation, of a polyacrylate resin containing carboxylic acid groups.

The novel pigment formulations are outstandingly suitable for pigmenting aqueous, alcoholic and aqueous-alcoholic printing ink systems and colored lacquer systems and are distinguished in particularlby good shelf life.

The substituents A, B, A', B', X and m are as defined in claim 1.

9 Claims, No Drawings

PIGMENT FORMULATIONS, PROCESSES FOR THEIR PREPARATION AND THEIR USE FOR PIGMENTING AQUEOUS, ALCOHOLIC OR AQUEOUS-ALCOHOLIC PRINTING INK SYSTEMS AND COLORED LACQUER SYSTEMS

The present invention relates to novel pigment formulations, processes for their preparation and their use for pigmenting aqueous, alcoholic or aqueous-alcoholic printing ink systems and coloured lacquer systems.

Monoazo pigments from the series of the acetoacetic acid arylides, of the naphthols or of the naphthoic acid arylides are valuable pigments which have acquired great economic importance for the preparation of lacquers, paints and printing inks. However, it is also known that these pigments have a certain solubility in organic solvents, which can have a very adverse effect on their applicability. Thus, for example, it is shown that, under certain circumstances, even when particular pigments are dispersed in printing varnishes, but in particular when storing printing inks of this type, the tinctorial strength frequently decreases and this leads to undesirable phenomena, such as a change in colour shade, a decrease in transparency and a change in viscosity.

To prevent the undesirable phenomena, described above, in organic solvent systems, it is proposed, for example in German Auslegeschrift No. 2,012,152 and German Auslegeschrift No. 2,012,153, to use a pigment mixture which contains a smaller proportion of an azo pigment, the coupling component of which is substituted by one or two free carboxylic acid or sulfonic acid groups.

According to Japanese Auslegeschrift No. 70/11,026, the viscosity of dispersions of particular azo pigments of the acetoacetic acid arylide series, in low-viscosity non-aqueous carrier materials, such as nitrocellulose carrier materials or rosin/toluene carrier materials, can be improved by preparing azo pigment mixtures which contain a smaller proportion of appropriate azo pigment-alkaline earth metal sulfonates or azo pigment-amine salts.

It has now been found that, by simultaneously mixing a monoazo pigment, a smaller proportion of a monoazo pigment substituted by at least one —COOH, —SO₃H, metal carboxylate or metal sulfonate group, and a polyacrylate resin containing carboxylic acid groups, pigment formulations suitable for pigmenting aqueous, alcoholic or aqueous-alcoholic printing ink systems and coloured lacquer systems are obtained which, despite the dissociation to be expected in such systems, surprisingly have a very good stability to recrystallisation, or shelf life, together with good pigment properties, without the rheological properties of the pigment formulations being noticeably impaired.

The invention thus relates to novel pigment formulations which contain (1) 10–90% by weight, based on the whole formulation, of a pigment mixture of (a) 99.5–90 mol %, preferably 99 to 97 mol %, based on the pigment mixture, of at least one monoazo pigment of the general formula I $$A-N=N-B \qquad (I)$$

and (b) 0.5–10 mol %, preferably 1–3 mol %, based on the pigment mixture, of at least one monoazo pigment of the general formula II $$(A'-N=N-B')-(X)_m \qquad (II)$$

in which A and A' are radicals of a diazo component of the benzene or naphthalene series, B and B' are radicals of a coupling component of the acetoacetic acid arylamide, naphthol or naphthoic acid arylamide series, X is —COOH, —SO₃H or a group of the formula III $$-COO^\ominus \; \frac{Me^{n\oplus}}{n} \qquad (III)$$

or of the formula IV $$-SO_3^\ominus \; \frac{Me^{n\oplus}}{n} \qquad (IV)$$

in which Me is a metal, and m and n independently of one another are the numbers 1, 2 or 3, and (2) 90–10% by weight, based on the whole formulation, of a polyacrylate resin containing carboxylic acid groups.

Of particular interest are pigment formulations, as described above, in which, in the formulae I and II respectively, A is a radical of the formulae

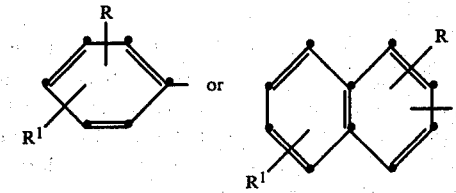

B is a radical of the formulae

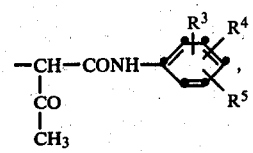

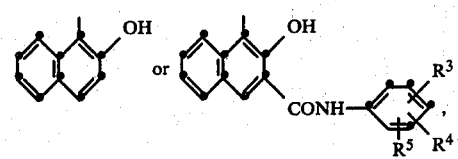

A'—X)ₘ is a radical of the formulae

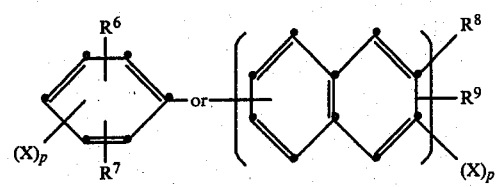

and

B'—(X)ₘ is a radical of the formulae

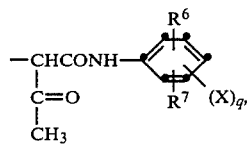

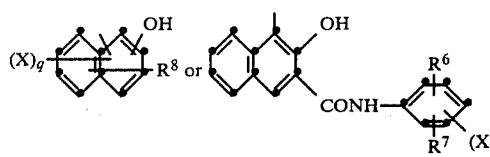

in which R and $R^1$ independently of one another are hydrogen, halogen, $C_1$-$C_2$ alkyl, $C_1$-$C_2$ alkoxy, $C_2$-$C_4$ alkylcarbamoyl, $C_2$-$C_4$ alkoxycarbonyl, trifluoromethyl or nitro, $R^3$, $R^4$ and $R^5$ independently of one another are hydrogen, halogen, $C_1$-$C_2$ alkyl, $C_1$-$C_2$ alkoxy, $C_2$-$C_4$ alkylcarbamoyl or nitro, $R_6$ and $R_7$ independently of one another are hydrogen, halogen, methyl, methoxy, trifluoromethyl or nitro, $R^8$ and $R^9$ independently of one another are hydrogen or halogen, X is as defined above, and p and q independently of one another are the numbers zero, 1, 2 or 3, with the proviso that the sum p+q is at least 1.

Possible halogen substituents are especially chlorine. Possible $C_1$-$C_2$ alkyl substituents are ethyl or especially methyl. Possible $C_1$-$C_2$ alkoxy substituents are ethoxy or preferably methoxy. Possible $C_2$-$C_4$ alkylcarbamoyl substituents are, for example, methyl-, ethyl- or n-propyl-carbamoyl. Methylcarbamoyl is preferred. Possible $C_2$-$C_4$ alkoxycarbonyl substituents are, for example, methoxy-, ethoxy- or n-propoxy-carbonyl. Methoxy- and ethoxy-carbonyl are preferred.

X is preferably a group of the formulae III or IV.

The metal Me is, for example, a monovalent alkali metal, such as Na, K or Li, a trivalent metal, such as Al, but preferably a divalent metal, such as Ba, Mn, Co, Ni, Cu, Zn and especially Ca, Mg or Sr.

Preferred pigment formulations of the type described above are those which contain at least one monoazo pigment of the formulae V or VI

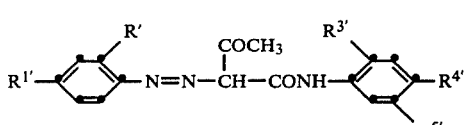

or

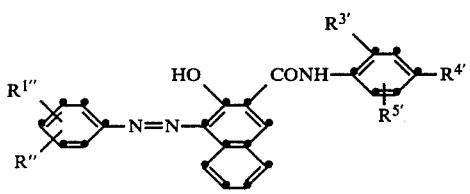

and at least one monoazo pigment of the formulae VII, VIII or IX

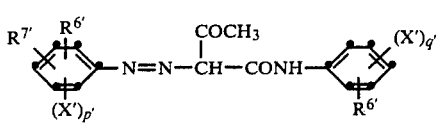

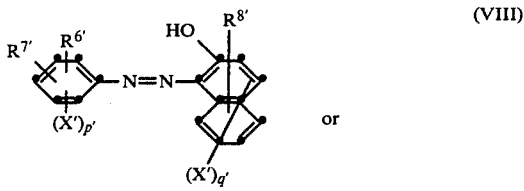

or

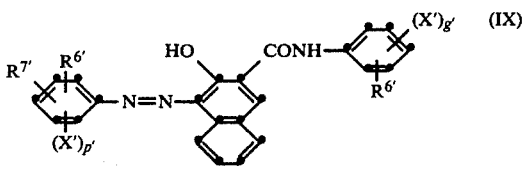

in which R' and $R^1$ independently of one another are hydrogen, chlorine, methyl, methoxy, ethoxy or nitro, R" and R'" independently of one another are hydrogen, chlorine, methyl, methoxy or nitro, $R^{3'}$ and $R^{5'}$ independently of one another are hydrogen, chlorine, methyl, methoxy or ethoxy, $R^{4'}$ is hydrogen, chlorine, methyl, methoxy, ethoxy or methylcarbamoyl, $R^{6'}$ is hydrogen, chlorine, methyl, methoxy or nitro, $R^{7'}$ is hydrogen or chlorine, $R^{8'}$ is hydrogen or bromine, X' is —COOH, —SO$_3$H or preferably one of the two groups of the formulae IIIa or IVa

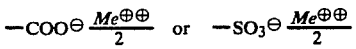

in which Me can be Ca, Mg or Sr, and p' and q' independently of one another are the numbers zero or 1, with the proviso that the sum p'+q' must be at least one.

If $R^{4'}$ is methylcarbamoyl, $R^{3'}$ and $R^{5'}$ are preferably hydrogen. In the formulae V and IX, $R^{3'}$, $R^{4'}$, $R^{5'}$ and $R^{6'}$ are very particularly preferably hydrogen in each case.

Particularly preferred pigment formulations are those which contain a pigment mixture of (a) a monoazo pigment of the formula

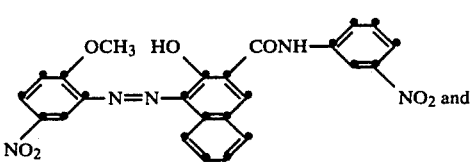

A monoazo pigment of the formula

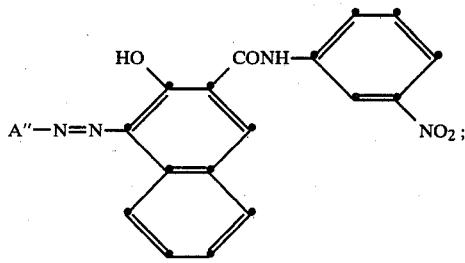

(b) a monoazo pigment of the formula

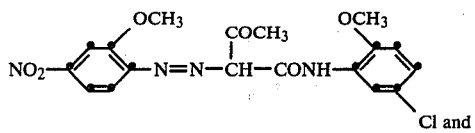

a monoazo pigment of the formula

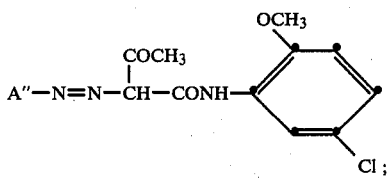

or especially a pigment mixture of
(c) a monoazo pigment of the formula

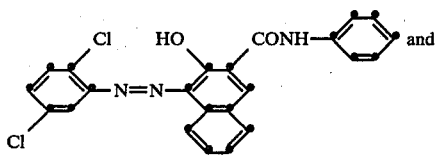

A monoazo pigment of the formula

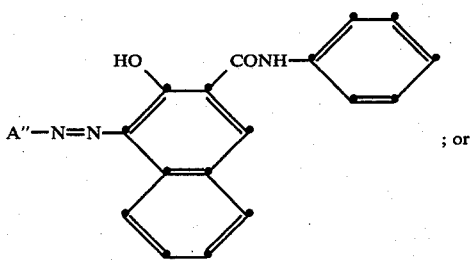

; or (d) a monoazo pigment of the formula

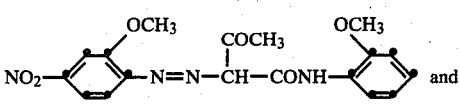

A monoazo pigment of the formula

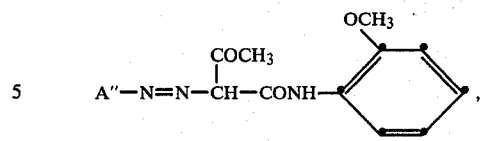

in which A" is

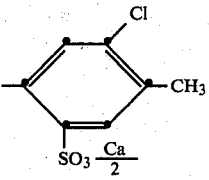

and the proportion of monoazo pigment containing —SO$_3$(Ca/2) groups is in each case 1.5–3 mol %, based on the pigment mixture.

The preparation of the pigment formulations according to the invention can be carried out by various methods, for example by coupling a coupling component or a mixture of coupling components of the naphthol, naphthoic acid arylamide or acetoacetic acid arylamide series, in an aqueous medium, with a diazonium compound of an amine of the benzene or naphthalene series or with a mixture of these diazonium compounds, in a molar ratio of about 1:1, it being necessary for the proportion of the coupling components and/or diazo components containing free carboxylic acid groups or sulfonic acid groups to be 0.5–10 mol %, preferably 1–3 mol %, an alkaline polyacrylate resin solution additionally being admixed before, during or after the coupling. After the coupling, the reaction mixture is reacted, if appropriate, with a water-soluble salt of a metal of valency n, of the type defined above, preferably with an acetate or halide, in order to form the desired metal carboxylates or metal sulfonates. Finally, the resin is precipitated as the free acid by acidification (for example with dilute hydrochloric acid), advantageously up to a pH of 4–4.5 as a rule, and the pigment formulation obtained is worked up by customary methods.

The addition of the stabilising coupling components and/or diazo components containing acid groups is carried out before or during the coupling reaction of the main components. If acid diazo components are added, the amines which are free of acid groups and the acid amines should preferably be diazotised separately and then used for the coupling either separately or mixed with one another. If acid coupling components are added, they can be added separately or mixed with the coupling components which are free of acid groups.

Acid diazo components which are suitable for the preparation of the pigment formulations according to the invention are obtained, for example, by diazotising the following amines: o-, m- or p-sulfoaniline, 2-chloroaniline-5-sulfonic acid, 4-chloroaniline-2-sulfonic acid, 4-methylaniline-2-sulfonic acid, 4-methoxyaniline-2-sulfonic acid, 4-chloro-5-methylaniline-2-sulfonic acid, 4-methyl-5-chloroaniline-2-sulfonic acid, 4-nitroaniline-2-sulfonic acid, 2-nitroaniline-4-sulfonic acid, anthranilic acid, 3- or 4-aminophthalic acid, 5-aminoisophthalic acid and 2-aminoterephthalic acid.

Both the acid amines and the amines which are free of acid groups, which, by diazotisation, produce the diazo components required for the preparation of the pigment formulations according to the invention, are known compounds. The diazotisation is carried out by known methods.

Examples of acid coupling components which are suitable for the preparation of the pigment formulations according to the invention are: 2-hydroxy-3-naphthoic acid, 2-hydroxynaphthalene-5-sulfonic acid, 2-hydroxynaphthalene-6-sulfonic acid, 2-hydroxynaphthalene-7-sulfonic acid, 2-hydroxynaphthalene-3,6-disulfonic acid, 2-hydroxynaphthalene-3,7-disulfonic acid, 1-hydroxynaphthalene-3-sulfonic acid, 1-hydroxynaphthalene-5-sulfonic acid, 1-hydroxynaphthalene-8-sulfonic acid, 1-hydroxynaphthalene-3,6-disulfonic acid, 2-(2'-hydroxy-3'-naphthoylamino)-benzoic acid, 3-(2'-hydroxy-3'-naphthoylamino)-benzoic acid, 4-(2'-hydroxy-3'-naphthoylamino)-benzoic acid, 2-acetoacetylamino-benzoic acid, 3-acetoacetylamino-benzoic acid and 4-acetoacetylamino-benzoic acid.

Both the acid coupling components and the coupling components which are free of acid groups, which are suitable for the preparation of the pigment formulations according to the invention, are known compounds.

The coupling is carried out by known methods and it can be advantageous, under certain circumstances, to add wetting agents and dispersing agents, for example nonionic, cationic or anionic surface-active substances. It is also advantageous to carry out a suitable after-treatment of the coupling mixture, following the coupling, by heating to elevated temperatures, preferably before the precipitation of the carboxylated acrylate resin, and to continue this after-treatment until sufficiently small and fine pigment crystals have formed.

As defined, the pigment formulations according to the invention contain 10 to 90% by weight of pigment mixture and 90 to 10% by weight of a polyacrylate resin containing carboxylic acid groups, preferably 30 to 70% by weight of pigment mixture (1) and 70 to 30% by weight of polyacrylate resin (2). The acid number of the polyacrylate resin to be used is advantageously 30 to 300, preferably 50 to 200. The polyacrylate resins containing carboxylic acid groups which are used are especially those which are obtained by polymerising acrylic acid and/or methacrylic acid or polymerising acrylic acid and/or methacrylic acid together with other acrylic monomers, for example acrylic acid esters and methacrylic acid esters. However, it is also possible to use polyacrylic compounds which have been prepared using other polymerisable carboxylic acids, for example crotonic acid or the like. The preferred polyacrylate resins are those which are soluble in an aqueous, aqueous-alcoholic or alcoholic medium, if appropriate with the addition of bases. These resins are commercially available in the acid form or in a partially or completely neutralised form.

Apart from the components to be used according to the invention, the formulations can contain other assistants, such as plasticisers, waxes, stabilisers and fillers.

The pigment formulations according to the invention can also be prepared by adding the pigment mixture according to (1) to an alkaline polyacrylate resin solution and then precipitating the product by means of acidification, by spraying the pigment mixture/resin solution, or continuously or discontinuously in kneaders by mixing the acid resin with the pigment mixture. In the case of preparation in a kneader, the polyacrylate resin can be precipitated from aqueous-ammoniacal solution directly in the kneader, by acidification, in the presence or absence of the pigment mixture, and the water which has separated out can be removed from the carrier resin melt. The kneading mixture of polyacrylate resin and pigment mixture is kneaded to the desired fineness, if appropriate with the addition of solvent and sodium chloride as grinding aids, and the kneading mixture is worked up to give the dry formulation. The formulations can also be prepared by the so-called flush process, whether this be carried out in kneading apparatuses or by the emulsion flush technique.

Solid formulations containing 50 to 60% by weight of pigment have proved to be the best products, the polyacrylate resin advantageously having an acid number of 60 to 200. For formulations which give particularly adhesive printing inks for PVC, for example, resins with an acid number of 50-120 are preferably suitable.

The pigment formulations according to the invention are very particularly suitable for pigmenting aqueous, alcoholic and in particular aqueous-alcoholic printing ink systems and coloured lacquer systems. The printing ink systems and coloured lacquer systems pigmented therewith are distinguished especially by good stability to recrystallisation, or shelf life, and also by good dispersibility, gloss, tinctorial strength, transparency and fastness to light and migration, without the rheological properties being noticeably impaired. They also have an excellent adhesiveness both on paper and on metals and plastics, and the films prepared therefrom have a good water resistance.

The formulations according to the invention can be used for the most diverse printing and lacquering applications. Examples are: the printing and lacquering of paper and coated paper, such as wall coverings, decorative paper and packing materials, of aluminum foil, of soft and hard PVC, of polyamide films, polystyrene films and cellulose acetate films, of cellulose glass and lacquered grades of cellulose glass, of corona-pretreated polyethylene films and polyester films and of substrates coated with polyvinylidene chloride. Any known processes, such as gravure printing, flexographic printing, silk screen printing, letterpress printing, dry offset printing and offset printing, can be used as the printing processes, and so-called roller coating, spraying, brushing and knife coating, for example, can be used as the lacquering processes.

In the preparation of coloured lacquers and printing inks, the formulations according to the invention are advantageously incorporated into the solvents or binder solutions, with stirring, no additional grinding process being necessary to disperse the pigments. This is carried out, for example, by the following processes:

Preparation of a colorant concentrate in a solvent, for example in ethanol, isopropanol, water/organic base or water/organic base/alcohol, in an acrylic monomer or in a binder solution diluted with solvent. The formulation concentration or pigment concentration to be chosen depends on the desired viscosity of the concentrate and is dependent inter alia on the solvent. Preferred concentrations are about 10 to 30% by weight of pigment. The concentrates thus obtained can then be mixed with the appropriate clear lacquers and varnishes in the desired ratio.

Stirring directly into the binder solution or the varnish, if appropriate with the addition of solvent or diluent in order to adjust the viscosity. In this way, it is possible to prepare coloured lacquers and printing inks which are ready for use or delivery.

A preferred process for the preparation of coloured lacquers or printing inks comprises incorporating the pigment formulations according to the invention, in water, alcohol or preferably in aqueous alcohol, into the desired polymer, with the addition of ammonia or an amine, for example a mono-, di- or tri-alkylamine, an alkanolamine or a heterocyclic amine, such as morpholine or piperazine, the carrier resin being dissolved and the pigment being finely dispersed in the application medium.

In the following examples, parts are by weight, unless stated otherwise, percentages are by weight and temperatures are given in degrees centigrade.

EXAMPLE 1

Diazotisation (a) diazo component which is free of acid groups:

38.4 parts by volume of 32% hydrochloric acid and 16.0 parts (0.0988 mol) of 2,5-dichloroaniline are added to 160 parts by volume of warm water at 80°. The mixture is stirred at 80° until the molten amine has dissolved. It is left to cool to 40° and about 150 parts of ice are then added, the temperature dropping to approximately 0°. At this temperature, 7 parts of sodium nitrite are added in portions in the course of 10 minutes, if appropriate with the addition of ice. After subsequent stirring for one hour at 0° to 5°, 0.7 part of active charcoal is added, the diazo solution is filtered until the filtrate is clear, and the residue is washed with a small amount of ice-water.

(b) acid diazo component:

0.27 part of 4-amino-2-chlorotoluene-5-sulfonic acid (0.0012 mol) is dissolved in 1 N aqueous sodium hydroxide solution and then treated with 1 N hydrochloric acid until the solution is acid. The amine hydrochloride thus obtained is diazotised at 0° to 3° by means of 0.08 part of sodium nitrite. The diazonium salt suspension thus obtained is then mixed with the diazo solution obtained as described under (a).

Preparation of the coupling component/carrier resin solution 26.9 parts of 2-hydroxy-3-naphthoic acid anilide are dissolved in a warm solution, at 60°, of 12.3 parts of NaOH in 190 parts by volume of water. After this solution has cooled to 40°, 145.4 parts of a 30% aqueousammoniacal dispersion of a carboxylated acrylic copolymer (for example ®Carboset XL-11, 30% and with acid number 74, from B.F. Goodrich Chemical Company) are added. This solution is made up to a volume of 500 ml with ice.

Coupling, after-treatment and precipitation of the pigment formulation

The coupling component/carrier resin solution obtained as described above (pH about 13.6) is treated with the mixture of the diazo solutions in the course of 30 minutes, at 10°, the pH value being kept at 12 to 12.5 during the coupling by the dropwise addition of 1 N solution hydroxide solution. After the addition of the diazo solution, 0.07 part of calcium chloride (as an aqueous solution) is added in order to form the calcium salt. The mixture is subjected to an after-treatment for a further 2 hours, by stirring at 70°, in order to prepare small fine pigment crystals. The pH value of the suspension is then adjusted to 4.5 by the slow dropwise addition of 1 N hydrochloric acid at 55°, the acrylate resin precipitating out. After subsequent stirring for one hour at 55°, the pigment formulation obtained is filtered off, washed with cold water until the washings are neutral, and dried at 70°–80° in a vacuum drying cabinet. 83 g (95% of theory) of dry pigment formulation containing 50% of pigment are obtained.

The above pigment formulation is processed further to give an aqueous-alcoholic printing ink, for example according to Example 8 below. The printing ink obtained is tested in respect of its shelf life. In this test, it is shown that the printing ink obtained with the pigment formulation according to the invention gives prints of very good transparency after storage for 7 days at 5° or 50°. The colour shade of the prints obtained with the formulation according to the invention remains virtually unchanged. If the above example is repeated, except that a corresponding amount of magnesium chloride is used in place of calcium chloride in order to form the magnesium salt, a pigment formulation which gives an equally good printing ink in respect of shelf life is obtained after coupling, after-treatment and precipitation.

EXAMPLE 2

Mixture of the diazo solutions 8.23 parts (0.049 mol) of 4-nitro-2-methoxyaniline and 0.22 part (0.001 mol) of 2-amino-4-chloro-5-methylbenzenesulfonic acid are diazotised separately, as in Example (1a) and (b), with hydrochloric acid and sodium nitrite in aqueous solution, and the two diazo solutions obtained are then mixed with one another.

Coupling component solution 11 parts of acetoacetic acid o-anisidide are dissolved, at room temperature, in a solution of 3 parts of NaOH in 300 parts by volume of water.

Coupling, after-treatment and precipitation of the pigment formulation

About 8 parts of crystalline sodium acetate are added to the mixture of the diazo solutions described above. The coupling component solution described above is then added dropwise in the course of 30 minutes, at 5° to 10° and pH 4–4.5. After the coupling, the pigment suspension obtained is adjusted to pH 9 with 1 N sodium hydroxide solution and treated with a solution of 0.057 part of CaCl$_2$ (97%) in 5 parts by volume of water, in order to form the calcium salt. 64.4 parts of a 30% aqueous carboxylated acrylic copolymer dispersion (Carboset XL 11) are then added, it being necessary for the pH value of the pigment dispersion to be kept at 9 by means of 1 N sodium hydroxide solution. After an after-treatment for two hours, by stirring at 70°, the carrier resin is precipitated at 55° by the slow dropwise addition of 1 N hydrochloric acid to pH 4.5. After stirring for a further one hour at 55°, the pigment formulation obtained is filtered off, washed with water until the washings are neutral, and dried at 70° to 80° in vacuo. 37.5 parts (97% of theory) of pigment formulation containing 50% of pigment are obtained.

An aqueous-alcoholic printing ink obtained with the above pigment formulation has a very good shelf life over 7 days at 5° or 50°, the colour shade, colour strength and transparency of the prints remaining virtually unchanged.

If the above example for the preparation of the mixture of the diazo solution is repeated, except that 0.001 mol of 4-amino-3-nitrobenzenesulfonic acid, 2-aminobenzoic acid, 3-aminobenzoic acid, 3-aminophthalic acid or 4-aminobenzenesulfonic acid is used in place of 2-amino-4-chloro-5-methylbenzenesulfonic acid, the procedure otherwise being the same, pigment formulations with equally good stabilisation effects are obtained.

EXAMPLE 3

Diazotisation 8.4 parts (0.05 mol) of 5-nitro-o-anisidine are diazotised by customary methods by means of hydrochloric acid and sodium nitrite in aqueous solution.

Coupling component mixture 10.05 parts of acetoacetic acid o-anisidide (0.0457 mol) and 0.33 part of 3-acetoacetylamino-benzoic acid (0.0043 mol) are dissolved, at room temperature, in a solution of 3 parts of NaOH in 300 parts by volume of water.

Coupling, after-treatment and precipitation of the pigment formulation

About 8 parts of crystalline sodium acetate are added to the diazo solution described above. The coupling component solution described above is then added dropwise in the course of 30 minutes at 5° to 10° and pH 4–4.5. After the coupling, the pigment suspension obtained is adjusted to pH 9 with 1 N sodium hydroxide solution and treated with a solution of 0.088 part of $CaCl_2$ (97%) in 5 parts by volume of water, in order to form the calcium salt. 64.4 parts of a 30% aqueous carboxylated acrylic copolymer dispersion (Carboset XL 11) are then added, it being necessary for the pH value of the pigment dispersion to be kept at 9 by means of 1 N sodium hydroxide solution. After an after-treatment for two hours, by stirring at 70° C., the carrier resin is precipitated at 55° by the slow dropwise addition of 1 N hydrochloric acid to pH 4. After stirring for a further one hour at 55°, the pigment formulation obtained is filtered off, washed with water until the washings are neutral, and dried at 70° to 80° in vacuo. 38.4 parts (99.4% of theory) of pigment formulation containing 50% of pigment are obtained.

An aqueous-alcoholic printing ink obtained with the above pigment formulation has a very good shelf life over 7 days at 5° to 50°, the colour shade, colour strength and transparency of the prints remaining virtually unchanged.

EXAMPLE 4

Diazotisation

Diazo component which is free of acid groups:

38.4 parts by volume of 32% hydrochloric acid and 16.2 parts (0.1 mol) of 2,5-dichloroaniline are added to 160 parts by volume of warm water at 80°. The mixture is stirred at 80° until the molten amine has dissolved. It is left to cool to 40° and about 150 parts of ice are then added, the temperature dropping to approximately 0°. At this temperature, 7 parts of sodium nitrite are added in portions in the course of 10 minutes, if appropriate with the addition of ice. After subsequent stirring for one hour at 0° to 5°, 0.7 part of active charcoal is added, the diazo solution is filtered until the filtrate is clear, and the residue is washed with a small amount of ice-water.

Preparation of the coupling component mixture/carrier resin solution 25.6 parts (0.0975 mol) of 2-hydroxy-3-naphthoic acid anilide and 0.87 part (0.0025 mol) of the disodium salt of 2-hydroxynaphthalene-3,6-disulfonic acid (=R salt) are dissolved in a warm solution, at 60°, of 12.3 parts of NaOH in 190 parts by volume of water. After this solution has cooled to 40°, 145.4 parts of a 30% aqueousammoniacal dispersion of a carboxylated acrylic copolymer (for example ®Carboset XL-11) are added. This solution is made up to a volume of 500 ml with ice.

Coupling, after-treatment and precipitation of the pigment formulation

The coupling component mixture/carrier resin solution obtained as described above (pH about 13.6) is treated with the diazo solution in the course of 30 minutes, at 10°, the pH value being kept at 12 to 12.5 during the coupling by the dropwise addition of 1 N sodium hydroxide solution. After the addition of the diazo solution, 0.15 part of calcium chloride (as an aqueous solution) is added in order to form the calcium salt. The mixture is subjected to an after-treatment for a further 2 hours, by stirring at 70°, in order to prepare small fine pigment crystals. The pH value of the suspension is then adjusted to 4.5 by the slow dropwise addition of 1 N hydrochloric acid at 55°, the acrylate resin precipitating out. After subsequent stirring for one hour at 55°, the pigment formulation obtained is filtered off, washed with cold water until the washings are neutral, and dried at 70°–80° in a vacuum drying cabinet. 82.5 g (94.6% of theory) of dry pigment formulation containing 50% of pigment are obtained.

The above pigment formulation is processed further to give an aqueous-alcoholic printing ink, for example according to Example 8 below. The printing ink obtained is tested in respect of its shelf life. In this test, it is shown that the printing ink obtained with the pigment formulation according to the invention gives prints with a very good transparency after storage for 7 days at 5° or 50°. The colour shade of the prints obtained with the formulation according to the invention remains virtually unchanged. If the above example is repeated, except that 0.67 part (0.0025 mol) of 6-bromo-2,3-hydroxynaphthoic acid is used in place of 0.87 part of R salt in the preparation of the coupling component mixture, 82.9 parts (95.1% of theory) of a pigment formulation containing 50% of pigment are obtained. A printing ink with an equally good shelf life can be prepared from this pigment formulation by the process described in Example 8.

EXAMPLE 5

Mixture of the diazo solutions 16.5 parts (0.098 mol) of 4-nitro-2-methoxy-aniline and 0.44 part (0.002 mol) of 2-amino-4-chloro-5-methylbenzenesulfonic acid are diazotised separately, as described in Example (1a) and (b), with hydrochloric acid and sodium nitrite in aqueous solution, and the two diazo solutions obtained are then mixed with one another.

Coupling component solution 25.7 parts of 2-methoxy-5-chloro-acetoacetanilide are dissolved, at room temperature, in a solution of 6 parts of NaOH in 600 parts by volume of water.

Coupling, after-treatment and precipitation of the pigment formulation

About 12 parts of crystalline sodium acetate are added to the mixture of the diazo solutions described above. The coupling component solution described above is then added dropwise in the course of 30 minutes, at 5° to 10° and pH 4–4.5, the pH value being kept constant by means of 1 N HCl. After the coupling, the pigment suspension obtained is adjusted to pH 9 with 1 N sodium hydroxide solution. 140 parts of a 30% aqueous carboxylated acrylic copolymer dispersion (Carboset XL 11) are then added, it being necessary for the pH value of the pigment dispersion to be kept at 9 by means of 1 N sodium hydroxide solution. After an after-treatment for two hours, by stirring at 70°, the carrier resin is precipitated at 55° by the slow dropwise addition of 1 N hydrochloric acid to pH 4.5. After subsequent stirring for one hour at 55°, the pigment formulation obtained is filtered off, washed with water until the washings are neutral, and dried at 70° to 80° in vacuo. 83.6 parts (99% of theory) of pigment formulation containing 50% of pigment are obtained.

An aqueous-alcoholic printing ink obtained with the above pigment formulation has a good shelf life, the colour shade, colour strength and transparency of the prints remaining virtually unchanged.

EXAMPLE 6

Mixture of the diazo solutions 16.8 parts (0.0974 mol) of 4-chloro-2-nitro-aniline and 0.57 part (0.0026 mol) of 2-amino-4-chloro-5-methyl-benzenesulfonic acid are diazotised separately in aqueous solution, as described in the preceding examples, and then combined.

Coupling component solution 21.1 parts (0.1 mol) of 2-chloroacetoacetanilide are dissolved, at room temperature, in a solution of 6 parts of NaOH in 600 parts by volume of water.

Coupling, after-treatment and precipitation of the pigment formulation

About 12 parts of crystalline sodium acetate are added to the mixture of the diazo solutions described above. The coupling component solution described above is then added dropwise in the course of 30 minutes, at 5° to 10° and pH 4–4.5. After the coupling, the pigment suspension obtained is adjusted to pH 9 with 1 N sodium hydroxide solution and treated with a solution of 0.12 part of CaCl$_2$ (97%) in 5 parts by volume of water, in order to form the calcium salt. 126 parts of a 31.5% aqueous carboxylated acrylic copolymer dispersion (Carboset XL 11) are then added, it being necessary for the pH value of the pigment dispersion to be kept at 9 by means of 1 N sodium hydroxide solution. After an aftertreatment for two hours, by stirring at 70°, the carrier resin is precipitated at 55° by the slow dropwise addition of 1 N hydrochloric acid to pH 4. After stirring for a further one hour at 55°, the pigment formulation obtained is filtered off, washed with water until the washings are neutral, and dried at 70° to 80° in vacuo. 72 parts (92% of theory) of pigment formulation containing 50% of pigment are obtained.

An aqueous-alcoholic printing ink obtained with the above pigment formulation has a very good shelf life, the colour shade, colour strength and transparency of the prints remaining virtually unchanged. If 14.9 parts (0.098 mol) of 4-amino-3-nitrotoluene are used in place of 16.8 parts of 4-chloro-2-nitroaniline as the diazo component and 19.9 parts of acetoacetanilide are used in place of 21.1 parts of 2-chloroacetoacetanilide as the coupling component, and if a corresponding amount of carrier resin is used (108 parts of Carboset XL 11 as a 31.5% dispersion, in place of 126 parts), according to Example 6 above, 66 parts (96% of theory) of pigment formulation containing 50% of pigment are obtained.

Aqueous-alcoholic printing inks obtained with these pigment formulations have a very good shelf life, the colour shade, colour strength and transparency of the prints remaining virtually unchanged.

EXAMPLE 7

Diazotisation 15.2 parts (0.1 mol) of 4-amino-3-nitrotoluene are diazotised, by known methods, by means of hydrochloric acid and sodium nitrite in aqueous solution.

Coupling component mixture/carrier resin solution 14 parts (0.0972 mol) of β-naphthol and 0.52 part (0.0028 mol) of 2-hydroxy-3-naphthoic acid are dissolved, at room temperature, in a solution of 12 parts of NaOH in 500 parts by volume of water. 97.6 parts of the carrier resin Carboset XL 11 (31% dispersion) are then added.

Coupling, after-treatment and precipitation of the pigment formulation

The diazo solution described above is added dropwise to the coupling component solution described above, in the course of 30 minutes, at 5° to 10° and pH 11–12. After the coupling, the pigment suspension obtained is adjusted to pH 9 with 1 N hydrochloric acid and treated with a solution of 0.15 part of CaCl$_2$ (97%) in 5 parts by volume of water, in order to form the calcium salt. After an after-treatment for two hours, by stirring at 70° C., the carrier resin is precipitated at 55° by the slow dropwise addition of 1 N hydrochloric acid to pH 4.5. After stirring for a further one hour at 55°, the pigment formulation obtained is filtered off, washed with water until the washings are neutral, and dried at 70° to 80° in vacuo. 58.4 parts (95% of theory) of pigment formulation containing 50% of pigment are obtained.

An aqueous-alcoholic printing ink obtained with the above pigment formulation has a very good shelf life, the colour shade, colour strength and transparency of the prints remaining virtually unchanged.

EXAMPLE 8

Preparation of a printing ink 12 parts of the 50% pigment formulation according to Example 1 are dispersed with 56 parts of a stock solution of 20 parts of ®AQUAHYDE 100 (water-soluble 30% acrylate resin, present as the amine salt, from Lawter Chemicals U.S.A.), 3 parts of morpholine and 33 parts of water, for 25 minutes with a blade stirrer at 3,000 rpm. After the addition of 32 parts of ethanol, the mixture is stirred for a further 5 minutes at 3,000 rpm. The aqueous-alcoholic printing ink or coloured lacquer thus obtained is then ready, for example, to be spread onto paper or soft aluminium foils.

The following are additional application examples for pigment/acrylate resin formulations for aqueous and alcoholic printing inks:

EXAMPLE 9

Gravure printing inks for PVC- and paper-based wall coverings

8% of the 50% pigment formulation according to Example 1,
36% ®Geon 351 (aqueous PVC copolymer emulsion with a solids content of 56%, from B. F. Goodrich Chemical Company),
4% of ®ZINPOL 1519 (40% acrylate resin solution in water/isopropanol 1:1, pH 8.5, from ZINCHEM U.S.A.),
30% of water,
20% of isopropanol,
2% of 25% ammonia solution.

The printing ink has a print quality which is superior in comparison with organic vinyl copolymer printing inks, and possesses a good adhesiveness also on PVC-coated wallpapers. The prints are furthermore distinguished by good embossability and abrasion resistance (dry and wet) and also good resistance to soap and detergent.

EXAMPLE 10

Gravure printing ink for decorative paper with melamine resin laminates

10% of the 50% pigment formulation according to Example 1,
40% of AQUAHYDE 100 (from Lawter Chemicals, U.S.A.),
20% of isopropanol,
28% of ethylene glycol monoethyl ether,
2% of 25% ammonia solution.

The prints possess a good fastness to bleeding on subsequent impregnation with melamine/formaldehyde precondensate solutions and have a good heat resistance on pressing at 150° and also a high fastness to light in the laminated panels.

EXAMPLE 11

Flexographic printing ink (a)

15% of the 50% pigment formulation according to Example 1,
10% of ZINPOL 14 (wax emulsion from ZINCHEM, U.S.A.),
20% of ZINPOL 259 (styrene-modified shellac emulsion from ZINCHEM),
3% of morpholine, 52% of water.

(b)

15% of the 50% pigment formulation according to Example 1,
5% of ®JONCRYL 677 (polyacrylate resin, acid number about 180-190, from Johnson-Wax, U.S.A.),
4% of morpholine,
33% of water,
33% of 95% ethanol.

These printing inks are suitable for printing paper, prelacquered aluminium foil and corona-pretreated polyethylene film.

EXAMPLE 12

Lacquer for the roller lacquering of soft aluminium foil

5% of the 50% pigment formulation according to Example 1,
14% of ®MOWITAL B30H (polyvinylbutyral from Hoechst, Germany),
1% of dibutyl phthalate,
70% of 95% ethanol,
10% of ethylene glycol monoethyl ether.

The lacquer applied on a lacquering machine by the kiss-roll coating process has a good adhesiveness and flexibility, high transparency, good fastness to bleeding and high fastness to light.

EXAMPLE 13

Flexographic printing ink for polyethylene and paper

15% of the 50% pigment formulation according to Example 1,
5% of CAP 504-0.2 (cellulose acetopropionate from Eastman-Kodak, U.S.A.),
15% of water,
65% of isopropanol.

The printing ink is distinguished by rapid drying-on and a good adhesiveness on corona-pretreated polyethylene film.

EXAMPLE 14

Dry offset printing ink for metal

20% of the 50% pigment formulation according to Example 1,
30% of ®SETALYN AM 541 (acrylic monomer from Kunstharsfabriek Synthese B.V., Holland),
44% of SETALYN AP 561 (acrylic prepolymer from Kunstharsfabriek Synthese B.V., Holland),
3% of Michler's ketone,
3% of benzophenone.

The printing ink can be printed onto prelacquered steel plate by dry offset printing and hardened under UV irradiation. The prints have a high gloss and good water resistance.

EXAMPLE 15

Gravure printing ink for various printing substrates

10% of the 50% pigment formulation according to Example 1,
18% of ZINPOL 1519 (polyacrylate resin, 50% in isopropanol, from ZINCHEM),
10% of water,
60% of isopropanol,
2% of 25% ammonia solution.

The printing ink has a good adhesiveness on the following materials: soft PVC, hard PVC, cellulose glass X, cellulose glass P, pretreated polyethylene film and prelacquered aluminium foil. The printing ink can be diluted with water or with alcohols.

EXAMPLE 16

2-Component lacquer for gravure lacquering on paper

10% of the 50% pigment formulation according to Example 1,
30% of AQUAHYDE 100 (from Lawter Chemicals),
5% of ®CIBAMIN M 100 (hexamethylolmelamine from Ciba-Geigy AG, Switzerland),
2% of morpholine,
52.5% of water/ethanol 1:1,
0.5% of p-toluenesulfonic acid.

After drying for 2 minutes at 130°, a lacquer coating with very good water and ethanol resistance, a very high softening point, good stability on heat sealing and good resistance to chemicals is obtained.

What is claimed is:

1. A pigment formulation which contains
   (1) 10-90% by weight, based on the whole formulation, of a pigment mixture of
   (a) 99.5–90 mol %, based on the pigment mixture, of at least one monoazo pigment of the general formula I

A—N=N—B  (I)

(b) 0.5–10 mol %, based on the pigment mixture, of at least one monoazo pigment of the general formula II

 (II)

in which A and A' are radicals of a diazo component of the benzene or naphthalene series, B and B' are radicals of a coupling component of the acetoacetic acid arylamide, naphthol or naphthoic acid arylamide series, X is —COOH, —SO₃H or a group of the formula III

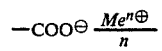 (III)

or of the formula IV

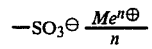 (IV)

in which Me is a metal, and m and n independently of one another are the numbers 1, 2 or 3, and
   (2) 90–10% by weight, based on the whole formulation, of a polyacrylate resin containing carboxylic acid groups.

2. A pigment formulation according to claim 1, wherein, in the formulae I and II respectively,
   A is a radical of the formulae

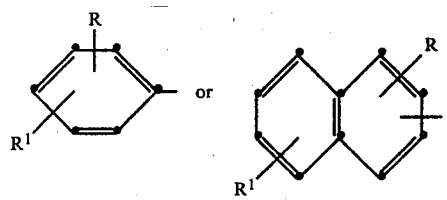

B is a radical of the formulae

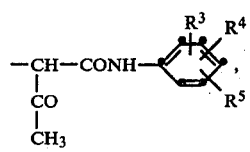

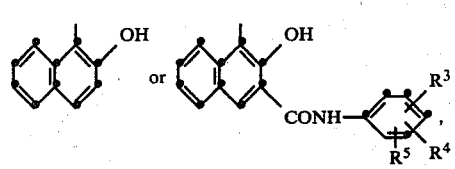

A'—(X)ₘ is a radical of the formulae

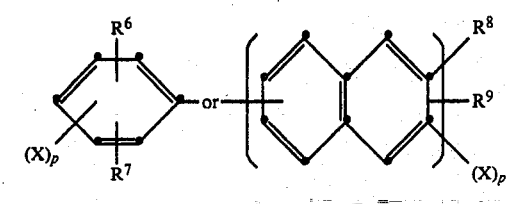

and
   B'—(X)ₘ is a radical of the formulae

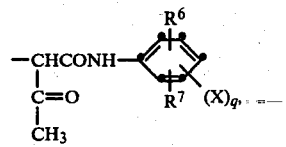

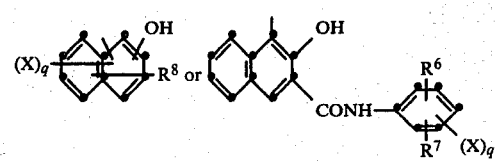

in which R and R¹ independently of one another are hydrogen, halogen, C₁-C₂ alkyl, C₁-C₂ alkoxy, C₂-C₄ alkylcarbamoyl, C₂-C₄ alkoxycarbonyl, trifluoromethyl or nitro, R³, R⁴ and R⁵ independently of one another are hydrogen, halogen, C₁-C₂ alkyl, C₁-C₂ alkoxy, C₂-C₄ alkylcarbamoyl or nitro, R₆ and R₇ independently of one another are hydrogen, halogen, methyl, methoxy, trifluoromethyl or nitro, R⁸ and R⁹ independently of one another are hydrogen or halogen, X is as defined in claim 1, and p and q independently of one another are the numbers zero, 1, 2 or 3, with the proviso that the sum p+q is at least 1.

3. A pigment formulation according to claim 1, which contains at least one monoazo pigment of the formulae V or VI

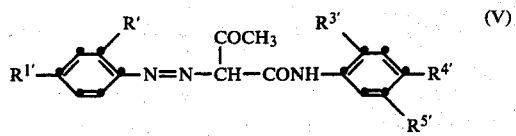 (V)

or

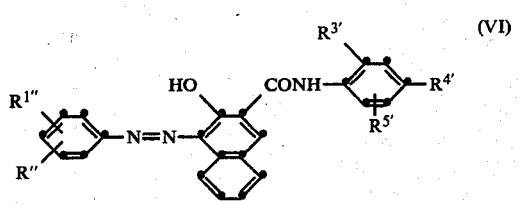 (VI)

and at least one monoazo pigment of the formulae VII, VIII or IX

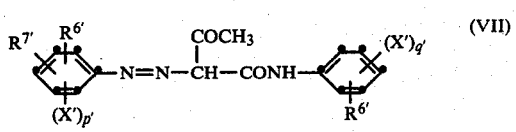 (VII)

-continued

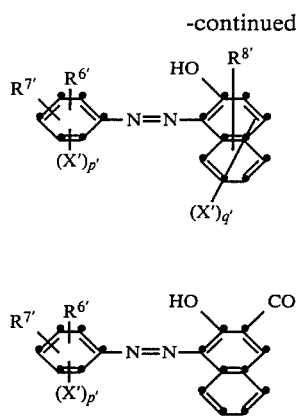

in which R' and R¹ independently of one another are hydrogen, chlorine, methyl, methoxy, ethoxy or nitro, R" and R¹" independently of one another are hydrogen, chlorine, methyl, methoxy or nitro, R³' and R⁵' independently of one another are hydrogen, chlorine, methyl, methoxy or ethoxy, R⁴' is hydrogen, chlorine, methyl, methoxy, ethoxy or methylcarbamoyl, R⁶' is hydrogen, chlorine, methyl, methoxy or nitro, R⁷' is hydrogen or chlorine, R⁸' is hydrogen or bromine, X' is —COOH, —SO₃H or one of the two groups of the formulae IIIa or IVa

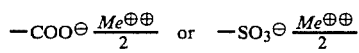

in which Me can be Ca, Mg or Sr, and p' and q' independently of one another are the numbers zero or 1, with the proviso that the sum p'+q' must be at least one.

4. A pigment formulation according to claim 3, in which X' is a group of the formulae IIIa or IVa and Me is Ca, Mg or Sr.

5. A pigment formulation according to claim 1, which consists of 30–70% by weight of pigment mixture (1) and 70–30% by weight of polyacrylate resin (2).

6. A pigment formulation according to claim 1, which contains 1–3 mol %, based on the pigment mixture, of at least one monoazo pigment of the general formula II.

7. A pigment formulation according to claim 1, which contains a pigment mixture of (a) a monoazo pigment of the formula

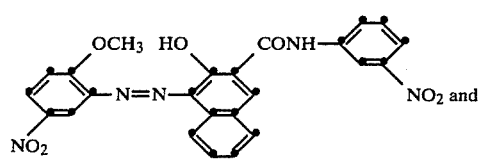

a monoazo pigment of the formula (b) a monoazo pigment of the formula

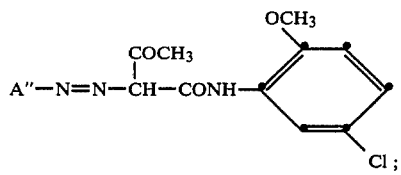

a monoazo pigment of the formula or especially a pigment mixture of
(c) a monoazo pigment of the formula a monoazo pigment of the formula ; or (d) a monoazo pigment of the formula

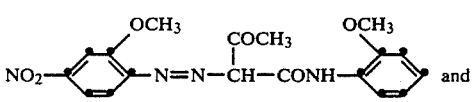

a monoazo pigment of the formula

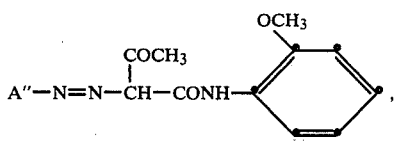

in which A″ is

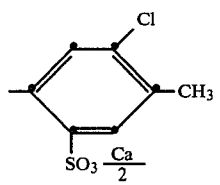

and the proportion of monoazo pigment containing —SO₃(Ca/2) groups is in each case 1.5–3 mol %, based on the pigment mixture.

8. A process for the preparation of a pigment formulation according to claim 1, which comprises coupling a coupling component or a mixture of coupling components of the naphthol, naphthoic acid arylamide or acetoacetic acid arylamide series, in an aqueous medium, with a diazonium compound of an amine of the benzene or naphthalene series or with a mixture of these diazonium compounds, in a molar ratio of about 1:1, it being necessary for the proportion of the coupling components and/or diazo components containing free carboxylic acid groups or sulfonic acid groups to be 0.5–10 mol %, an alkaline polyacrylate resin solution additionally being admixed before, during or after the coupling, and then, if appropriate, reacting the mixture with a water-soluble salt of a metal of valency n, n being as defined in claim 1, in order to form the metal carboxylates or metal sulfonates, precipitating the resin as the free acid by acidification and working up the pigment formulation obtained.

9. A process for the preparation of printing inks or colored lacquers, which comprises incorporating a pigment formulation according to claim 1, in water, aqueous alcohol or alcohol, into the desired polymer, with the addition of ammonia or an amine, the carrier resin being dissolved and the pigment being finely dispersed in the application medium.

* * * * *